(12) United States Patent
Sun

(10) Patent No.: US 9,399,942 B2
(45) Date of Patent: Jul. 26, 2016

(54) REDUCTANT DELIVERY PERFORMANCE DIAGNOSTICS SYSTEM

(71) Applicant: INTERNATIONAL ENGINE INTELLECTUAL PROPERTY COMPANY, LLC, Lisle, IL (US)

(72) Inventor: Pu Sun, Canton, MI (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 346 days.

(21) Appl. No.: 14/027,513

(22) Filed: Sep. 16, 2013

(65) Prior Publication Data

US 2015/0075270 A1 Mar. 19, 2015

(51) Int. Cl.
*F01N 11/00* (2006.01)
*G01M 15/10* (2006.01)
*F01N 3/20* (2006.01)

(52) U.S. Cl.
CPC ............ *F01N 11/002* (2013.01); *F01N 3/2066* (2013.01); *F01N 11/00* (2013.01); *G01M 15/106* (2013.01); *F01N 2900/1808* (2013.01); *F01N 2900/1811* (2013.01); *Y02T 10/24* (2013.01); *Y02T 10/47* (2013.01)

(58) Field of Classification Search
None
See application file for complete search history.

(56) References Cited

U.S. PATENT DOCUMENTS

| | | | |
|---|---|---|---|
| 2008/0276601 A1* | 11/2008 | Katou et al. | 60/287 |
| 2009/0301068 A1* | 12/2009 | Fujita et al. | 60/286 |
| 2010/0071349 A1* | 3/2010 | Kitazawa | 60/277 |
| 2011/0047986 A1* | 3/2011 | Drasner et al. | 60/286 |
| 2012/0067031 A1* | 3/2012 | Wang et al. | 60/277 |
| 2013/0199157 A1* | 8/2013 | Henry et al. | 60/274 |
| 2013/0213014 A1* | 8/2013 | Ohno | 60/277 |
| 2013/0227935 A1 | 9/2013 | Fontana | |
| 2014/0245719 A1* | 9/2014 | Mitchell et al. | 60/274 |

FOREIGN PATENT DOCUMENTS

JP 53010924 * 2/1978

* cited by examiner

*Primary Examiner* — Robert R Raevis
(74) *Attorney, Agent, or Firm* — Jack D. Nimz; Jeffrey P. Calfa

(57) ABSTRACT

A method for diagnosing reductant delivery performance of a reductant delivery system is provided. The method provides an outlet pressure sensor at a reductant outlet of the reductant delivery system and a virtual pressure sensor in an exhaust stream where reductant is injected into the stream. The method comprises calculating a downstream reductant flow rate using the outlet pressure sensor and the virtual pressure sensor; and calculating an upstream reductant flow rate within the reductant delivery system using at least one of a temperature sensor, a pressure sensor and a control valve. The calculated downstream and upstream reductant flow rates are compared, and diagnostics is conducted based the comparison to find the malfunctions in the reductant delivery system. An intrusive self-consistent diagnostics method allows for detection of malfunctions in the outlet pressure sensor and the virtual pressure sensor can be determined.

13 Claims, 2 Drawing Sheets

REDUCTANT DELIVERY PERFORMANCE DIAGNOSTICS SYSTEM

BACKGROUND

Selective catalytic reduction ("SCR") systems are used to reduce emissions in the exhaust of diesel engines. One method applied by SCR systems involves the addition of a gaseous or liquid reductant (also referred to as a reducing agent), such as ammonia or urea, to the exhaust gas stream from an engine. The reductant is thereby absorbed onto a catalyst where the reductant reacts with nitrogen oxides ("$NO_x$") in the exhaust gas to form water vapor and nitrogen.

The amount of reduction added to the $NO_x$ conversion system depends on the amount of $NO_x$ exhaust that is produced by the engine. $NO_x$ conversion systems therefore measure the generated $NO_x$ and then determine a corresponding amount of reductant added to the exhaust stream based on the pressure differential between the exhaust stream and the reductant supply system. A physical or virtual sensor may detect the $NO_x$ concentration of the exhaust flow, allowing the SCR to determine the appropriate dosage of ammonia to be injected into the exhaust stream. A reductant delivery system can then deliver the appropriate dosage of ammonia by adjusting certain parameters in the reduction delivery system by way of a pump and a control valve. The flow rate for the dosage of reductant can be calculated by a one-dimensional fluid equation, or a one-dimensional gas equation using signals from various sensors in the system. For example, the system may use information obtained from pressure sensors, temperature sensors, and the flow path cross sectional area of the reductant delivery system.

For a variety of reasons, however, the actual amount of the reductant supplied into the exhaust stream may differ from the calculated or intended amount. That is, the actual flow of reductant into the exhaust stream may not be accurately determined by the equipment. For example, one of more of the pressure sensors in the exhaust gas purification system may degrade, malfunction, or drift causing faulty measurements. Also, clogs and corrosions may occur in the flow path of the reductant delivery or exhaust systems. These issues may result in a faulty measurement thereby causing the system to improperly calculate in the amount of reductant dosage that is actually supplied to the $NO_x$ exhaust. As a result of such a faulty dosage, the $NO_x$ conversion efficiency will decrease and the $NO_x$ emissions will increase.

Employing a diagnostics system can ensure that the actual reductant dosage matches the desired dosage. A diagnostics system can monitor the actual flow of the reductant to ensure that the actual flow matches the desired flow necessary for proper $NO_x$ conversion. Performing diagnostics can detect when the calculated flow rate of the reductant differs from the actual flow rate of the reductant and help determine the cause for the discrepancy.

SUMMARY

Embodiments described herein relate to a method for diagnosing reductant delivery performance of a $NO_x$ conversion system. In one embodiment, an outlet pressure sensor is provided at a reductant outlet of a reductant delivery system and a virtual pressure sensor is provided in an exhaust stream at a location where the reductant is injected into the exhaust stream. The method comprises calculating a downstream reductant flow rate using the outlet pressure sensor and the virtual pressure sensor; and calculating an upstream reductant flow rate within the reductant delivery system using at least one of a temperature sensor, a pressure sensor and a control valve. The calculated downstream reductant flow rate is compared with the calculated upstream reductant flow rate, and diagnostics is conducted based on the results from the comparison of the calculated reductant flow rates.

Another embodiment provides a system for diagnosing reductant delivery performance of a $NO_x$ conversion system. The system comprises a reductant delivery system configured for generating a reductant flow. The reductant delivery system comprises at least one reductant gas pressure sensor, at least one reductant gas temperature sensor, at least one control valve and at least one delivery system outlet. The system also comprises a reductant delivery line configured for delivering reductant from the reductant delivery system to an exhaust stream of an engine. The reductant delivery line comprises an injection mixer. The system also comprises an outlet pressure sensor installed at the outlet of the reductant delivery system, and a virtual pressure sensor installed in the exhaust stream at the injection mixer. The system may also comprise a control mechanism configured for calculating the flow rate of reductant within the reductant delivery system.

DETAILED DESCRIPTION

Figure 1:
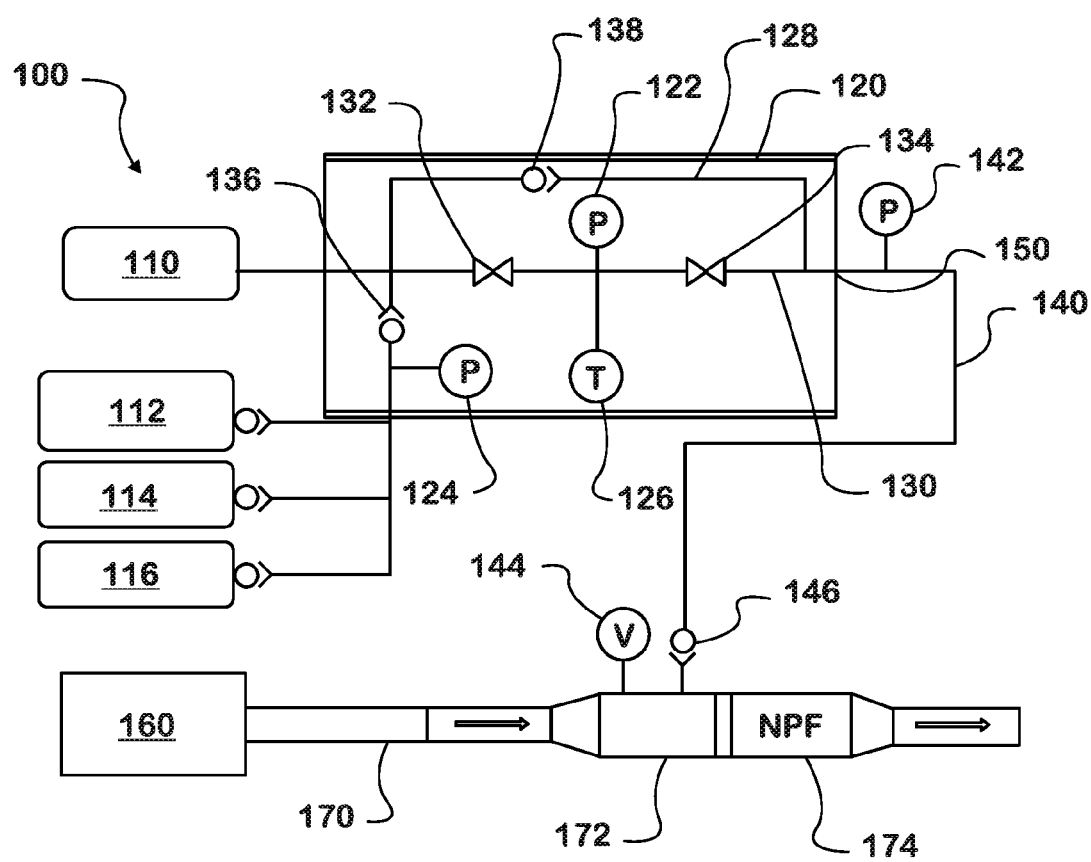
FIG. 1 depicts a flow chart for a method of diagnosing a $NO_x$ conversion system in accordance with an embodiment of the present technology.

The present technology presents methods and systems for performing diagnostics on the delivery performance of a reductant delivery system. In particular, the present technology provides methods and systems for performing diagnostics on a reductant delivery system that comprises a gaseous reductant flowing at a super-sonic flow rate.

Injecting a reductant into an exhaust stream is an effective method to reduce $NO_x$ emissions and comply with EPA standards. In using this method, the flow of the reductant into the exhaust stream should be monitored to ensure that the appropriate amount of reductant is being supplied to achieve the proper conversion. Typically, the reductant flow is monitored using various sensors (e.g., temperature and pressure sensors) in a reductant delivery system along with the known flow areas, which can be adjusted using control valves. For example, the if the temperature and pressure of a reductant delivery system is known, and the flow area as controlled by a control valve is known, the amount of reductant flow can be calculated using a one-dimensional fluid or gas equation.

Problems can arise, however, when one of the sensors has drifted or malfunctioned, or where the control valve does not provide a true flow area (e.g., where the flow pipes have become clogged or corroded). If a pressure sensor is providing a faulty reading, then the actual flow of reductant supplied will not match the expected reductant flow generated by the one-dimensional equation. In this situation, an improper amount of reductant may be delivered to the exhaust stream resulting in a reduction in conversion efficiency. It is therefore desirable to provide a system and/or method for performing diagnostics on the reductant delivery system to monitor for a sensor drift or malfunction issue.

In sub-sonic flowing reductant delivery systems (i.e., systems that circulate reductant at a flow rate that is below the speed of sound), upstream sensors and gauges can promptly recognize downstream changes made to the system. For example, when an upstream control valve is opened to change the flow rate, a downstream pressure sensor will promptly recognize the resultant change in pressure. Accordingly, intrusive diagnostics methods can be used to recognize shifts or malfunctions in the equipment of a sub-sonic reductant delivery system. Intrusive diagnostics methods involve changing the flow rate by opening or closing a control valve and monitoring the change in readings at the various sensors. If the sensors respond to the change in flow rate appropriately, then the system is working appropriately and no changes need to be made. However, if a sensor does not appropriately respond to the flow rate change within a prescribed time, and/or the deviation exceeds a prescribed value, a fault code can be issued for such a sensor, which can allow the system to continue to accurately monitor the flow rate.

Specifically, when the flow area of a control valve is changed, the reading on the pressure sensor located upstream of the control valve should have a corresponding value that is in consistent with the change in flow area. If the pressure sensor does not reflect the change, however (and continues to do so after further testing), then a fault code for this pressure sensor will be entered to adjust for the sensor misread. In other words, diagnostics can be performed by intrusively changing the upstream and downstream conditions (i.e., temperature, pressure, flow area) and monitoring the flow response. When the monitored response is not as expected based on the change in conditions, this serves as an indication that at least one piece of equipment is not working properly, and further diagnostics can be performed to find the root cause of the issue. For control of the reductant delivery system control, prescribed information and/or signals can be provided to replace or accommodate for the faulty sensor thereby allowing so that an appropriate dosage can be delivered.

These intrusive methods are suitable for use in $NO_x$ conversion systems that employ liquid ammonia or other sub-sonic flowing reductant fluids. The same methods cannot be used, however, in $NO_x$ conversion systems that employ super-sonic (i.e., above the speed of sound) flowing reductant. For example, in certain $NO_x$ conversion systems, solid ammonia is used as a source for reductant. In such systems, solid ammonia (or ammonia metal) is heated via an external heating source. This heating creates a gaseous ammonia that generates a high pressure in a reductant delivery system. And because the pressure of the gaseous ammonia is significantly higher than the pressure of the exhaust flow, the flow of the reductant in the reductant delivery system is super-sonic. In a super-sonic system, because of the high flow speed, changes that occur downstream may not be detectable by upstream sensors. Similarly, a change in downstream conditions may not have any effect on the flow rate. Accordingly, the present technology provides a method and system for conducting diagnostics in a reductant delivery system that employs super-sonic flowing reductant.

FIG. 1 depicts a schematic diagram of a $NO_x$ conversion system 100 in accordance with the present technology. The $NO_x$ conversion system 100 includes an engine 160, which can be a diesel engine, for example, and an exhaust line 170. The NO conversion system 100 also includes a reductant delivery system 120, which generates gaseous ammonia for delivery into the exhaust line 170, via a reductant delivery line 140.

The reductant delivery system 120 may include a start cartridge 110 and additional solid reductant cartridges (112, 114 and 116) which may comprise, for example, solid ammonia. In between the reductant cartridges (112, 114 and 116) and the start cartridge 110 are a main pressure sensor 124 and a directional check valve 136. In practice, the solid reductant cartridges are heated by an external heating source (not shown), thereby generating gaseous reductant. In certain embodiments, the gaseous reductant may be gaseous ammonia, for example. The main pressure sensor 124 monitors the pressure of the gaseous reductant at the directional check valve 136. When the pressure at the directional check valve 136 reaches a certain threshold, the gaseous reductant flows through the valve 136.

Downstream from the directional check valve 136, the reductant is split into two delivery lines 128 and 130. In the first delivery line 128 (depicted at the top of the reductant delivery system 120 in FIG. 1), a second directional check valve 138 is positioned to control the flow of gaseous reductant in the reductant delivery system 120. That is, when the pressure at the directional check valve 138 reaches a certain threshold, the gaseous reductant can flow through the valve 138. A shut-off valve 132 and a control valve 134 are positioned in the second delivery line 130. Also situated in the second delivery line 130, between the shut-off valve 132 and the control valve 134 are a temperature sensor 126 and a pressure sensor 122.

The reductant delivery system 120 also comprises a reductant outlet 150, whereby the reductant exits the reductant delivery system 120 to the reductant delivery line 140. The reductant delivery line 140 delivers the reductant from the reductant delivery system 120 to the exhaust line 170, which runs from the engine 160. An outlet pressure sensor 142 is positioned at the outlet 150 for monitoring the pressure of the reductant at the outlet 150. The reductant delivery line 140 also comprises a reductant injector 146 for injecting reductant into the exhaust stream of at a location 172 of the exhaust line 170. Accordingly, exhaust comprising $NO_x$ will flow from the engine 160, through the exhaust line 170 and react with the reductant at location 172. A particulate filter 174 may be positioned downstream from location 172 for removing diesel particulate matter or soot from the exhaust gas stream of the engine 160. In certain embodiments, the particulate filter 174 may be a $NO_x$ particulate filter ("NPF") which combines the $NO_x$ conversion and filtering capabilities together. Downstream from the particulate filter 174, the converted exhaust stream flows out of the exhaust line 170.

A virtual pressure sensor 144 is provided inside the exhaust line 170 at location 172. The virtual pressure sensor 144 may use software, for example, to calculate a virtual pressure in the exhaust line 170 based on information from the exhaust flow and upstream pressure.

By adding the virtual pressure sensor 144 and the outlet pressure sensor 142, the present technology provides a way to provide diagnostics on the reductant flow within the reductant delivery system. When operating correctly, the pressure values monitored by the virtual pressure sensor 144 and the outlet pressure sensor 142 will bear a relationship to one another that is dependent upon the flow rate of the reductant through the reductant delivery line 140. Accordingly, using the virtual pressure sensor 144 and the outlet pressure sensor, 142 a reductant flow rate can be obtained, because the flow at those sensors is sub-sonic.

When the equipment of the reductant delivery system 120 is working properly, including the lines, valves and sensors, the flow of the gaseous reductant can be calculated based on the parameters at the pressure sensor 122, the temperature sensor 126 and the settings of the shut-off valve 132 and the control valve 134. However, when one of the sensors, valves, or lines is malfunctioning or not working properly, the actual amount of gaseous ammonia delivered will not be as calculated. In certain embodiments of the present technology, the heating of the solid reductant to produce gaseous reductant may result in super-sonic flow of the reductant within the reductant delivery system. Accordingly, in certain embodiments, it will not be possible to perform diagnostics intrusively within the reductant delivery system. However, as described above, the reductant flow within the reductant delivery line 140 can be used in the diagnostics because the flow in that line is sub-sonic and outside of the reductant delivery system.

Though the flow rate within the reductant delivery system 120 may be super-sonic, the flow rate outside of the reductant delivery system 120, in particular, within the reductant delivery line 140 can be sub-sonic. Using the outlet pressure sensor 142 and virtual pressure sensor 144, the downstream flow rate of reductant in the reductant delivery line can be obtained, and this flow rate is independent of the sensors and the control valve area inside the reductant delivery system. This flow rate can be compared with the upstream flow rate within the reductant delivery system 120, as calculated by the sensors and valves within the reductant delivery system 120. In a properly functioning system, the flow rate calculated for the reductant delivery line 140 should be comparable to the flow rate calculated by the reductant delivery system 120.

Depending on the conditions and other circumstances in the system, the upstream flow rate may differ slightly from the downstream reductant flow rate. However, when the calculated flow rates differ significantly, it can serve as an indication that there is an error in one or both of the calculations. Whether a difference is considered a significant difference sufficient to indicate an error will depend on the particular conditions of the particular system. Therefore, in certain embodiments of the present technology, a predetermined value, or a threshold, may be established for a particular system to indicate that an error has occurred. For example, in certain embodiments, when the calculated upstream reductant flow rate differs by more 10% from the calculated downstream reductant flow rate, the system will recognize that a calculation error has occurred. In certain embodiments, the predetermined value necessary to indicate an error may be more or less than 10%. The predetermined value or threshold may be determined based on emission requirements set forth by legislation, or other governing body, for example.

When the calculated reductant flow rates differ by more than a predetermined threshold, then diagnostics can be performed to determine whether the error is with the calculation of the upstream reductant flow rate or the downstream reductant flow rate. Because the downstream reductant flow is sub-sonic, intrusive diagnostics can be used to determine whether there is a problem with the outlet pressure sensor 142, the virtual pressure sensor 144, or the flow path of the reductant delivery line 140. If the result of the intrusive diagnostics identifies a fault with one or more of the aforementioned components of the reductant delivery line or exhaust line, then the system can recognize the issue and further diagnostics can be performed to issue a corresponding fault code.

If, after conducting intrusive diagnostics on the reductant delivery line indicates that the calculation of the downstream reductant flow rate is accurate, then it can be deduced that the difference in the two calculations is a result of an error in the upstream reductant flow rate calculation. With the knowledge that the downstream flow rate calculation is accurate, diagnostics can be performed on the reductant delivery system to determine whether one or more of the pressure sensor, temperature sensor, or the control valve area is at fault. Accordingly, the present technology provides a way to conduct diagnostics on a reductant delivery system where the reductant flow within the system is super-sonic. The present technology provides a way to conduct diagnostics that is independent of the sensor signals inside the reductant delivery system.

Figure 2:
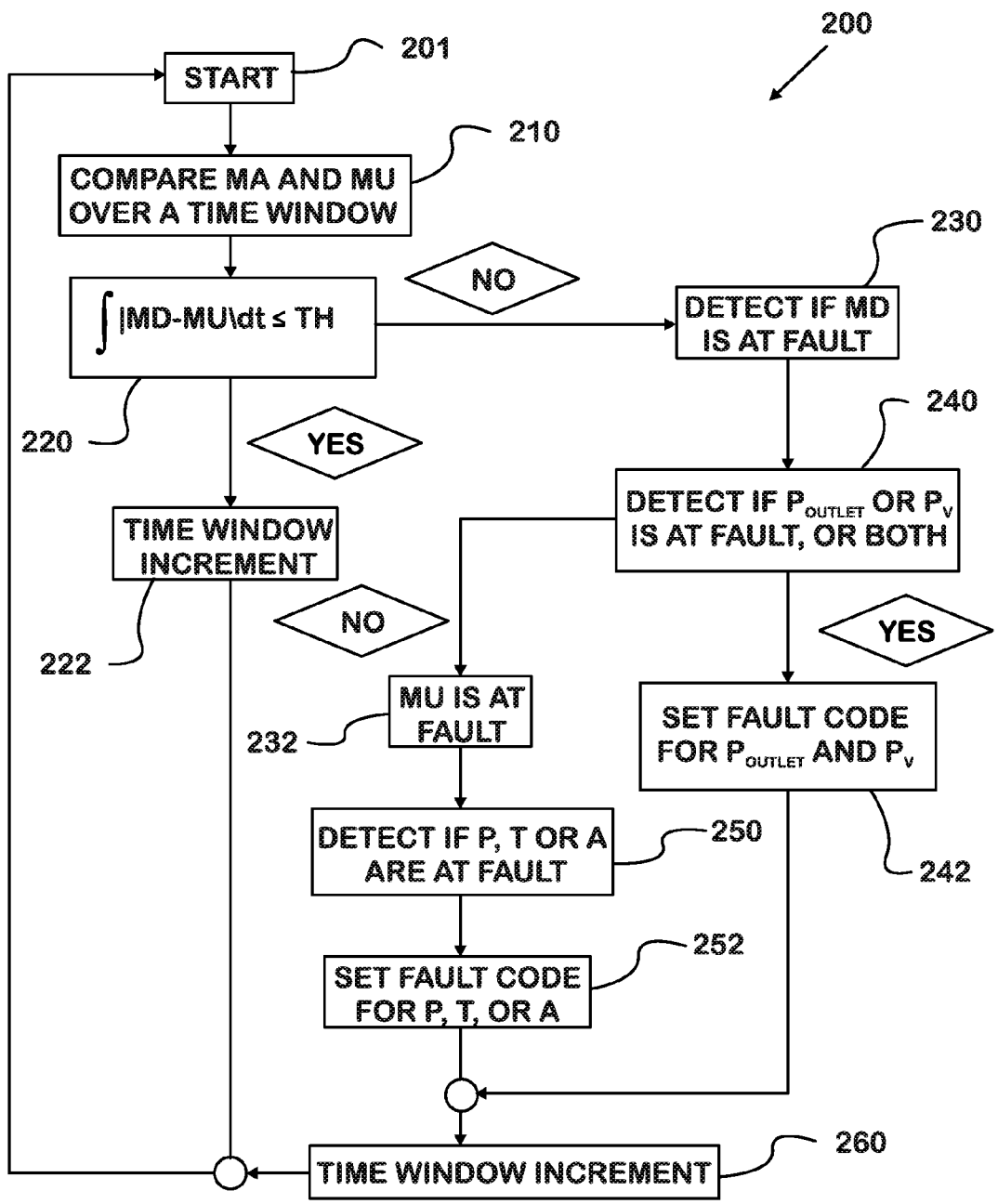
FIG. 2 depicts an embodiment of a $NO_x$ conversion system with an engine in accordance with an embodiment of the present technology.

The present technology also provides a method for conducting diagnostics of a $NO_x$ conversion system. FIG. 2 depicts a flow diagram of a method 200 for conducting diagnostics in accordance with an embodiment of the present technology. In FIG. 2, various symbols are used to represent certain features of the method. Those symbols can be interpreted as follows:

$P_{Outlet}$ represents the pressure measured at the outlet pressure sensor (e.g., outlet pressure sensor 142 depicted in FIG. 1).

$P_V$ represents the pressure measured at the virtual pressures sensor (e.g., virtual pressure sensor 144).

A represents the reductant flow area within the reductant delivery system as controlled by the control valve (e.g., control valve 134).

MU represents the upstream reductant flow rate, as calculated by the pressure sensor (e.g., pressure sensor 122) and temperature sensor (e.g., temperature sensor 126) of the reductant delivery system, and the flow area A provided by the control valve.

MD represents the downstream reductant flow rate within the reductant delivery line as calculated from $P_{Outlet}$ and $P_V$.

TH represents the predetermined threshold for identifying an error in the calculation of one of the upstream flow rate MU, or downstream flow rate MD.

FIG. 2 depicts a repeating method for monitoring and conducting diagnostics on a $NO_x$ conversion system. Box 201 signifies the start of the method. At step 210, the measured upstream flow rate MU is compared with the downstream flow rate MD and calculated over particular time window. For example, the upstream flow rate MU within the reductant delivery system may be calculated for a period of 10 second using the information provided by the pressure sensor 122, temperature sensor 126 and control valve 134. This value is compared with the downstream flow rate MD as calculated by outlet pressure sensor 142 and virtual pressure sensor 144.

At step 220 the comparison of the two flow rates are applied to a comparison equation. For example, the flow rates may be compared using the particular equation, based on the integral of the calculated flow rates over a time interval using the following equation:

$$\int |MD-MU| dt \leq TH$$

Where the results of the comparison are less than the predetermined threshold TH, then the comparison signifies that there are no errors in the calculation. Accordingly, the method proceeds down path 221 to step 222, where a time window is incremented, and then the process starts over at the start, or step 201. This cycle allows for continual monitoring of the flow rate equations. When no issues or errors are detected, no adjustments need to be taken, and the monitoring process continues.

If, however, the results of the comparison result in a difference greater than the predetermined threshold TH, then there is a problem with one or both of the flow rate calculations and diagnostics must be conducted. Because the comparison is not less than TH, the method proceeds down path 225 to step 230. At step 230 the method considers whether the calculation of the downstream flow rate MD is at fault at step 230. At step 240 the method detects wither the $P_{Outlet}$ or $P_V$, or both, are at fault. That is, if there is a problem with one of the outlet pressure sensor 142 or the virtual pressure sensor 144, then the difference between the calculated flow rates may be the result of the calculation in the downstream flow rate MD. Intrusive diagnostics can be used at step 240 to determine whether one or both of the outlet pressure sensor 142 or virtual pressure sensor 144 are malfunctioning, or operating inaccurately. For example, when the reductant flow rate is adjusted by a certain amount, the measurements recorded at the sensors should respond in a predictable amount.

If the sensors do not respond to the flow rate adjustment as anticipated, then the intrusive diagnostics method can determine which sensor has shifted or is malfunctioning, and the method proceeds down path 240, and the fault code can be issued.

If there intrusive diagnostics of the downstream reductant flow rate calculation determines that neither $P_{Outlet}$ nor $P_V$ is at fault, the calculation of the downstream flow rate MD is not at fault. In this instance, the method would proceed down path 243 to step 232. At step 232 the method logically deduces that calculation of the upstream flow rate MU is at fault. Accordingly, at step 250, diagnostics would be performed on the reductant delivery system to determine whether the pressure P measured by pressure sensor 122, temperature T measured by the temperature sensor 126, or the flow rate area A controlled by the control valve 134, is at fault. Because the upstream flow rate MU within the reductant delivery system should be the same as the downstream flow rate MD in the reductant delivery line, the downstream flow rate MD can be used to determine whether the values P, T and A respond appropriately to a change in the flow rate. Once it is determined which sensors, instruments and/or flow paths are faulty, and the value or degree of the fault, a fault code can be set for the sensors. For example, the control mechanism can adjust the flow rate algorithms governing the $NO_x$ conversion system to account for the shift, malfunction or other issue with the sensors, instruments and/or flow paths. After accommodating for this adjustment, the method proceeds to step 260 where a time window is incremented, and then the process starts over at the start, or step 201.

In certain embodiments the present method can be implemented by running a dynamometer test for a driving cycle to collect a pressure signal with the instrumental pressure sensor located in the reductant injection location in the exhaust flow line 170. Using this experimental data, virtual pressure sensor 144 can be created. Next, the reductant flow rate algorithm can be generated using the outlet pressure sensor 142 and the signal from the virtual pressure sensor 144. Diagnostics can then be created for the reductant delivery flow, and the outlet pressure sensor 142 using the appropriate one-dimensional fluid or gas equations. These one-dimensional equations can be determined or generated by a control mechanism for the $NO_x$ conversion system, for example. Finally, the predetermined diagnostics threshold TH can be determined such that the reductant $NO_x$ conversion system satisfies any emission requirements set forth by legislation, for example.

The presently described system and method provides way to conduct diagnostics on a super-sonic reductant delivery system, without using the sensor signals inside the reductant delivery system to calculate a flow rate for diagnostics purposes. The present technology therefore solves the diagnostics problem for super-sonic flowing gaseous reductant delivery systems, including those systems that deliver gaseous ammonia from a solid ammonia metal source. Moreover, the present system and method does not require linear dependency in the diagnostics method between the upstream flow rate and the readings of the sensors in the reductant delivery system. Accordingly, the present technology provides a method to detect system malfunctions or sensor shifts with relatively high accuracy.

The present technology also provides a method for performing diagnostics during the operation of the reductant delivery system and under dynamic conditions. This is an improvement over previous methods that are only operable under certain conditions and at certain points during the delivery operation, such as at the start, or end of the operation, or in certain steady-state conditions. Because the present technology discloses a system and method that is capable of conducting diagnostics under dynamic conditions, it increases the likelihood that malfunctions, sensor drifts, and other problems will be found sooner and more efficiently during the reductant delivery process.

The invention claimed is:

1. A method for performing diagnostics of reductant delivery performance of a NOx conversion system, the method comprising the steps of:
   providing an outlet pressure sensor at a reductant outlet of a reductant delivery system;
   providing a virtual pressure sensor in an exhaust stream at a location where the reductant is injected into the exhaust stream;
   calculating a downstream reductant flow rate using at least one of the outlet pressure sensor and the virtual pressure sensor;
   calculating an upstream reductant flow rate within the reductant delivery system using at least one of a temperature sensor, a pressure sensor and a control valve;
   comparing the calculated downstream reductant flow rate with the calculated upstream reductant flow rate;
   and conducting diagnostics based on the results from the comparison of the calculated downstream reductant flow rate with the calculated upstream reductant flow rate.

2. The method of claim 1, wherein said conducting diagnostics step further includes issuing a fault code corresponding to a malfunction of at least one sensor of the NOx conversion system.

3. The method of claim 1, wherein, when the calculated downstream reductant flow rate differs from the calculated upstream reductant flow rate by at least a predetermined threshold, the conducting diagnostics step further includes determining whether the calculated downstream reductant flow rate is inaccurate.

4. The method of claim 3, wherein, when the calculated downstream reductant flow rate is determined to be inaccurate, the conducting diagnostics step further comprises conducting downstream diagnostics to detect a malfunction in at least one of the outlet pressure sensor and the virtual pressure sensor.

5. The method of claim 4, wherein the step of conducting downstream diagnostics comprises conducting intrusive diagnostics.

6. The method of claim 5, wherein the intrusive diagnostics includes monitoring the relationship between the pressure measured by the outlet pressure sensor and the virtual pressure sensor at two or more different reductant flow rates.

7. The method of claim 3, wherein, the calculated downstream reductant flow rate is not determined to be inaccurate, and further comprising the step of conducting reductant delivery system diagnostics.

8. The method of claim 7 wherein the step of conducting reductant delivery system diagnostics detects a fault of at least one of a reductant gas pressure sensor and a reductant temperature sensor.

9. The method of claim 1 wherein the reductant is ammonia.

10. The method of claim 9, wherein the ammonia is ammonia gas inside the reductant delivery system.

11. The method of claim 1, wherein reductant flow inside the reductant delivery system is super-sonic.

12. The method of claim 11, wherein the reductant flow outside the reductant delivery system is sub-sonic.

13. A system for diagnosing reductant delivery performance of a NOx conversion system comprising:
   a reductant delivery system configured for generating a reductant flow, the reductant delivery system comprising at least one reductant gas pressure sensor, at least one reductant gas temperature sensor, at least one solid ammonia cartridge, at least one control valve and at least one delivery system outlet;
   a reductant delivery line configured for delivering reductant from the reductant delivery system to an exhaust stream of an engine, the reductant delivery line comprising an injection mixer;
   an outlet pressure sensor installed at the outlet of the reductant delivery system;
   a virtual pressure sensor installed in the exhaust stream at the injection mixer; and
   a control mechanism configured for calculating the flow rate of reductant within the reductant delivery system and wherein;
   the reductant flow in the reductant delivery system comprises gaseous ammonia flowing at a super-sonic flow rate and the reductant flow in the reductant delivery line comprises ammonia flowing at a sub-sonic flow rate.

* * * * *